Dec. 25, 1945.                M. GREGOR                    2,391,778
                        VARIABLE PITCH PROPELLER
                        Filed Oct. 22, 1943          2 Sheets-Sheet 2

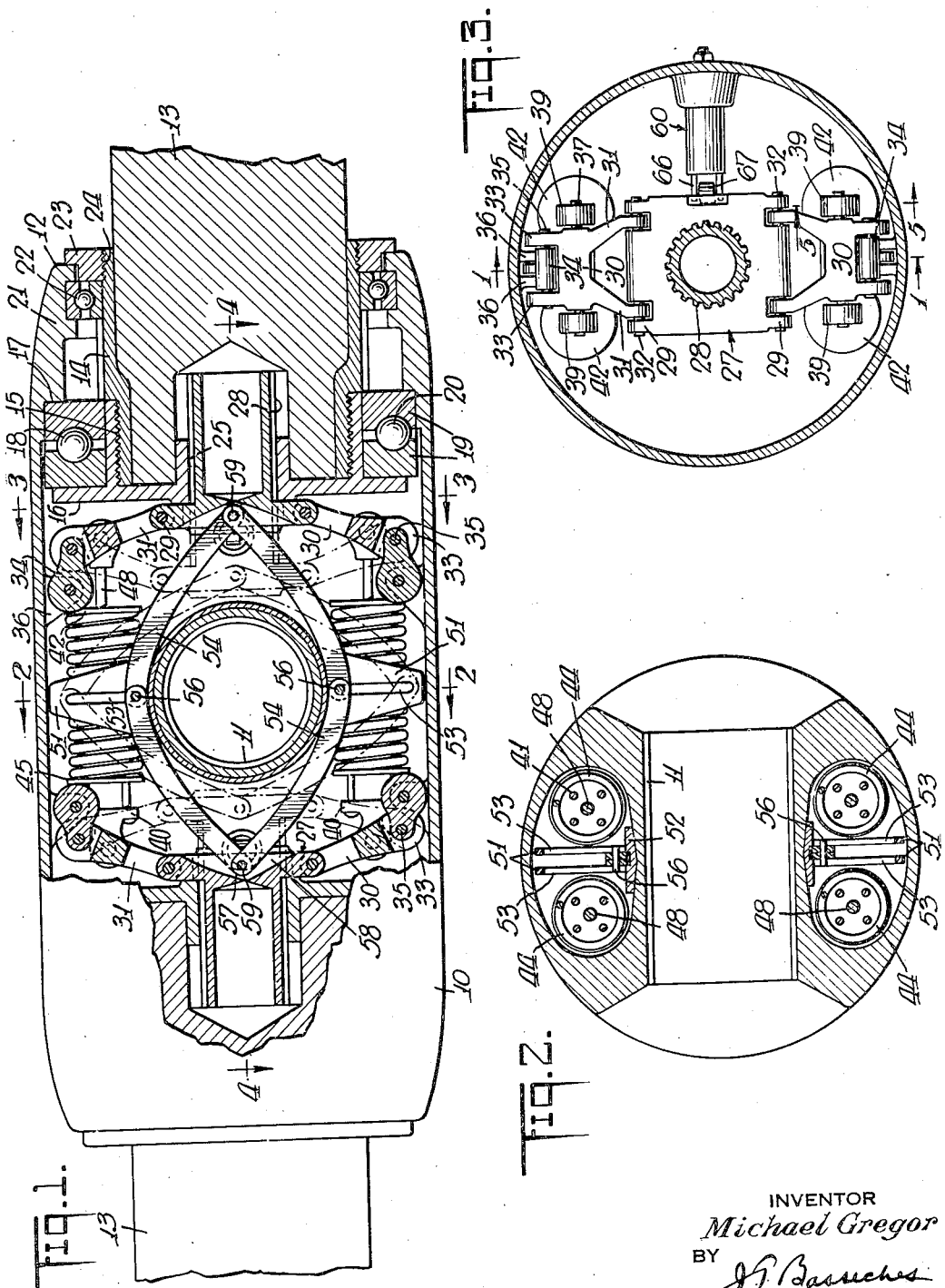

INVENTOR
Michael Gregor
BY
ATTORNEY

Patented Dec. 25, 1945

2,391,778

UNITED STATES PATENT OFFICE 2,391,778

VARIABLE PITCH PROPELLER

Michael Gregor, New York, N. Y.

Application October 22, 1943, Serial No. 507,244

3 Claims. (Cl. 170—162)

This invention relates to propellers for aeroplanes and other vehicles which derive traction through propeller-driven media; more particularly my invention relates to propeller constructions whereby the pitch of the propeller is automatically adjusted to meet various requirements in use.

Known to me is the provision of propellers for flying machines and the desirability of altering the pitch of the propeller to meet conditions in use, such as "take-off," "climbing," "high speed" and "cruising" speeds. These devices largely include manual operation under the control of the pilot, leaving it to his judgment what setting of the pitch of the propeller is to be employed to meet the conditions confronting him, such as "take-off," "climbing" or "cruising" speeds.

The design for the best aero-dynamic efficiency of the propeller dictates a predetermined rotational speed which, for securing the primary efficiency of design, should eliminate the human element of adjustment.

The primary purpose of my invention is to provide a variable adjustment of the propeller whereby, automatically and without manual control, the pitch of the propeller is maintained to secure a high operating efficiency during all service conditions such as "take-off," "climbing" and "cruising" and "high speeds"; and vice versa, in "descent" and in "landing"; while at the same time leaving the pilot in full control of the full power of the engine as may require over speed to meet the exigencies of landing operations which may confront him.

My invention is predicated upon and has as its object to provide the use of the centrifugal force generated during rotation of the propeller to effect an automatic increase in the pitch of the propeller upon encountering a desirable rotational speed of the propeller shaft and to include means progressively to increase the pitch of the propeller during cruising speeds, and to hold the pitch of the propeller at the most efficient pitch irrespective of the centrifugal force which was utilized to convert the pitch of the propeller as a preliminary operation such as in steps of (1) "take-off" and (2) "climbing." More specifically, it is an object of my invention to provide an automatic variable pitch propeller characterized by maintenance of a low pitch with the employment of high engine speed for "take-off," and further characterized by achieving medium pitch with high speed for "climbing," and still further characterized by construction for achieving high pitch with low engine speeds for "cruising" after having gone through the cycle of the first two steps noted.

Still further objects of my invention reside in the provision of an automatic pitch propeller characterized by the inclusion of a means whereby predetermined low pitch is maintained with high engine speed for "take-off" and the inclusion of centrifugally controlled means for increasing the pitch of the propeller for "climbing" and adjusting the pitch of the propeller to maximum high pitch, combined with means for holding and maintaining the achieved high pitch position of the propeller within predetermined lower engine speeds for maximum efficiency of "cruising."

Still further objects of my invention reside in the provision of an automatic pitch propeller which includes means to increase the pitch of the propeller by centrifugal force and to maintain a predeterminedly desirable pitch of the propeller irrespective of the engine speed utilized to set the pitch of the propeller, whereby maximum efficiency is secured during "cruising" thereby making available to inexperienced pilots the adjustment of the pitch of the propeller for most economical "cruising" at the lowest effective revolution of the engine propeller.

Still further objects of my invention reside in the provision of a propeller mounting assembly in which the most efficient pitch position of the blades is maintained, predicated upon the desirable attributes of the propeller, designed to operate approximately at, or precisely at, a constant speed factor, by taking into account that the employment of an aero-dynamical neutral aerofoil section of the blades of the propeller will improve the functioning of the variable pitch control device.

Still further objects of my invention reside in the provision of a variable pitch propeller which is simple in operation and inexpensive in cost.

For the attainment of the foregoing objects and such further objects as may appear herein or be hereinafter pointed out, I make reference to the accompanying drawings forming a part hereof, in which:

Figure 1 is a longitudinally fragmentary sectional view of the hub portion of my device taken on the line 1—1 of Figure 3;

Figure 2 is a section taken on the line 2—2 of Figure 1;

Figure 3 is a section taken on the line 3—3 of Figure 1;

Figure 4 is a fragmentary sectional view taken on the line 4—4 of Figure 1;

Figure 5 is an enlarged detail taken on line —5 of Figure 3;

Figure 6 is a perspective view of the centrifugally effected weight balance;

Figure 7 is a fragmentary sectional view with the weight in the neutral position.

Making reference to the drawings, I have shown a hub housing 10 arranged to be mounted upon the engine shaft by the boring 11 formed therein. The hub housing 10 has its ends 12 formed to receive the propeller blades 13. The axial ends of the blades being fitted by shrinking or casting within a sleeve 14. This sleeve, in turn, is threaded at 15 to engage the flange 16, cooperating with the seat 17 to hold there-between the thrust bearing 18, constituting the ball races 19 and ball bearings 20. The forward end of the housing adjacent the opening 12 is provided with spaced flanges 21—21 in the annulus between which there is positioned a second ball race 22. A collar 23 engages a threaded portion 24 on the sleeve 14 to hold the inner end of the blade in rotational position in the bearings 18 and 22 just described.

The flange 16 is provided with an axial boring 25 which is provided with an internal helically-splined portion 26. Within the helical portion there is fitted, diametrical to each other, centrifugally actuated weights 27 shown in Figure 6, comprising an external helically-splined stud 28 rigidly affixed to the weight 27 just described. It will be understood that axial slidable movement of the weight member 27 with the splined portions 26 and 28 in engagement with each other will serve to rotationally move the propeller blades 13—13 within the housing 10 in the bearings 18 and 22 previously described. The weight 27 is formed with ears 29—29 to which is connected toggles 30 comprising legs 31 which fit between the ears and are held in this position by the cross-pin 32. The upper end of the toggle 30 is formed with spaced knuckles 33 embracing the link 34 and being held in this position by the pin 35 passing through the knuckles 33 and a bearing orifice formed in one end of the link 34. The opposite end of the link 34 is pivoted between the ears 36 formed and projecting from the inner side of the housing 10.

It will thus be observed that radial movement of the weight 27 radially perpendicular to the axial line through the boring 11 may be effected while preventing rotational movement of the spline 28, carried by the weight 27. The toggles 30, heretofore described, each carry between their free ends anchor pins 37 upon which are mounted anchoring eyelets 38 and 39 (see Figure 5). The anchoring eyelet 38 is provided with a flange 40 through which headed pins 41 pass. These pins further pass through plate 42 at the opposite end of spring 44, each end of the pins being appropriately headed to prevent removal from the eyelet and plate, respectively. The plate 42 is formed with a central enlargement 43, axially to position the last convolution of the spring 44. A second plate 45 formed with orifices 46 is mounted for sliding movement upon the pins 41 (four of these being used). This plate 45 is formed with a central orifice 47 to receive the headed link 48, the free end of which 49 is screw-threaded by or otherwise affixed to the anchoring eyelet 39 previously described. It will thus be seen that separation of the toggles 30 from each other is by a compressive force which is against the expansion force of the spring 44.

Centrally positioned substantially at right angles to the axial line of the boring 11 of the webbing 50 there is affixed radially directed legs 51—51, as will be more clearly apparent from an inspection of Figures 1 and 2. These legs are carried by the collar 52 and are each provided with radial slots 53. Between these legs there are positioned arcuately-shaped links 54 whose inner ends 55 are guided to move radially by the pin 56 whose ends slide within the slot 53. The opposite outer ends 57 of the links 54 are anchored at the rear face of the weights 27 in slots 58 there provided and by passing the cross-pin 59 through orifices formed adjacent the ends 57 of the links 54 previously mentioned. It will be observed from the construction just described that by the employment of the links 54 and the slots 53 in the upstanding legs 51, that the movement of the weights to and from each other is equalized as the weights and the parts carried thereby move from the position shown in full lines in Figure 1 to the position shown in dotted lines in Figure 1. The movement of the weights 27 can only be effected against the compressive resistance of the spring 44. Suitable means may be used to minimize the friction in movement of the spring parts, as will be readily understood. This is accomplished when the centrifugal force of rotation moves the weights from the position shown in dotted lines or that shown in Figure 7, outwardly from the center to the position shown in full lines in Figure 1 and Figure 4. By reason of the splined connection between the stud 28 and the internally splined portion of the flange 26, the blades are given a rotational effect, varying the predetermined pitch of the blades 13.

In accordance with my invention to design the propeller blades to maintain best efficiency at approximately or precisely constant speed of the propeller when it has maximum pitch at "cruising" speeds, I have designed the spring tension of the spring 44 to resist movement by the centrifugal action imparted to the weight 27 until a predetermined engine speed is achieved; say, 5% over normal rating, with the springs drawing the weights toward each other, and with the propeller blades then at low pitch. This is a condition achieved and found desirable in "take-off." As momentum of the vehicle is secured to the point where it is desirable to "climb," increase in the engine's speed beyond the above predetermined rated speed brings into play the centrifugal force which overcomes the spring tension of the spring 44 to move the weights away from each other and thereupon progressively increases the pitch of the propeller. When the predetermined height has been reached and the pilot levels off, the engine may be accelerated to higher speeds forcing the weights to the maximum position shown in Figures 1 and 4. It now becomes desirable, because of the design of the propeller blades, to maintain a constant speed for "cruising" to secure maximum efficiency, then to lower the engine's rotational speed while still holding the maximum pitch of the blades, or to operate at high speeds with the maximum pitch at the rated R. P. M. of the engine. For this purpose I provide a pitch setting, and within a limited action, a pitch holding member in the form of a pressure detent 60 comprising a sleeve 61 which is conveniently screw threaded at one end 62 into a boring 63 in the wall of the housing 10 previously described, in a direction generally in parallelism to the boring 11 arranged to receive the engine drive shaft. The shell 61 is open at its lower end 64 and within this is mounted the pin 65 which has spaced legs 66 holding the roller 67 by a cross-pin 68. The upper end of the pin 65 projects within the sleeve 64 and is urged outwardly by the spring 69 acting against the flange 70 formed on the pin. Outward displacement of the pin from the sleeve 61 is prevented by the collar 71 engaging the shell 64. The upper end of the spring 69 is given variable tension by the rider 72 which is urged against the spring 69 by the set screw 73 passing through the closed end of the sleeve 61. A lock nut 74 serves to maintain the selected setting for the screw 73. Thus it will be observed that by feed of the set screw against the rider 72, predetermined pressure, within limits, may be exerted upon the spring 69 and, in turn, on the roller 67.

The roller 67 of the detent normally lies in the path of one edge 75 of the weight 27. This is formed at its outer end with a camming edge 76 and a latching lip 77.

When viewed with the weights in the position shown in Figure 7, which is the condition of the weights with the propeller blades and before predetermined centrifugal action displaces the weights outwardly, the roller 67 of the detent lies in the path of the edge 75 of the same. As centrifugal forces move the weights from the axial position to the limiting position where the face 78 of the weights contact the abutment 79 of the flange 16, the limiting angularity of pitch of the propeller blades has been reached. This movement serves, first, to have the camming surface 76 engage the roller 67 and displace it against the compression of the spring 69 and then as the limiting position of the weights 27 is reached, the roller 67 falls into latching engagement with the latching lip 77, restraining inward movement of the weights, notwithstanding any decrease in rotational speed of the propeller that is best determined for "cruising" and the consequent tendency of the spring 44 to draw the weights back towards the center.

In this way, notwithstanding the diminished rotational speed of the propeller shaft the maximum pitch of the propeller is maintained by the pitch setting member 60.

It will be observed from the description thus far made, that by my construction the following operation of the mechanism is secured:

With the propeller shaft quiescent, the mechanism takes the position shown in dotted lines in Figure 1 with the weights 27 in the position shown in Figure 7. Rotation of the engine maintains this position with the blades located at the predeterminedly designed minimum pitch. This is the desirable condition of the blades for "take-off." As the engine speed is increased, the spring 44 acting upon the toggles 30 retains the weights and therefore the minimum pitch of the propeller blades 13 as during "take-off." As the plane moves, gaining momentum or initial climb, it is desirable to over-speed the engine and the propeller group and the springs 44 are designed accordingly. Gradually the necessity of over-speed is diminishing and the normal speed of operation of the engine is essential. As the resistance of the air density diminishes, as a predetermined factor the engine speed is increased and the weights are moved progressively to an intermediate position gradually as they overcome the resistance of the spring 44 increasing the pitch until the maximum displacement and maximum high pitch position is achieved. This occurs at the end of the climb and the leveling off by the pilot.

The centrifugal force being thereafter diminished, by the reduction in engine speed the pitch setting mechanism 61 comes into play to engage the latching lip 77 on the weights, thus automatically holding the propeller blades in maximum pitch position. The pilot may then throttle down, within limits, the engine speed for cruising while the propeller blades are thus held in the high pitch position by the pitch setting member 60, and this position is maintained notwithstanding the insufficiency of the centrifugal force to hold the splined studs in the extreme position.

At landing, the pilot throttles down the engine speed further. When the revolutions of the propeller drop out below a predetermined speed, the springs 44 overcome the restraining action of the pitch holding member 60 and the propeller returns to low pitch.

If the landing attempt is not successful, the pilot is in full control to use the full power of the engine with over-speed, as may be necessary to "pull out" again and try another landing, as the blades lie somewhere between low pitch and high pitch and are adjustable automatically to high pitch or intermediate climbing pitch as the pilot may find it necessary to over-speed the engine.

It will be understood that while I have shown a pitch holding member and centrifugally actuatable weights responsive to increase and decrease of engine speeds, the movement of these parts may be stabilized to smoothen out a change in position by suitable inertia dampening means known in the art.

By the mechanism provided, it will be observed that my device takes into account the moment of forces around the longitudinal axis of rotation of the propeller blades. There are three factors producing such a moment of force:

(1) The aerodynamical moment produced by the blades having an aerofoil section due to movement of the blades in the air.

(2) The centrifugal twisting moment created by the shape of the blades.

(3) The moment of force supplied by the controlling device.

The design of the propeller blades is made so as to balance the above moments of forces and practically relieve the actuating mechanism from interferences and the unnecessary friction ordinarily required to be overcome in putting the actuating mechanism into play.

Thus, in accordance with my invention, it will be observed that acknowledging the primary efficiency is to design the propeller to secure maximum efficiency by maintaining an approximate or precisely constant speed, my invention makes possible the adjustment of the pitch and the automatic releasing of the maximum pitch to give the desirable performance and desirable variation of the pitch of the propeller.

My invention, it will be observed, has the advantage obtained by the use of a restraining force in the linkage system actuated by centrifugal force whereby deflection of the resilient force can be reduced and the desired tension can be obtained at various positions of the masses linked to the resilient force.

It will be further observed that my invention, by the use of compression springs, permits the retainment of the necessary ratio of the resilient force at the rotational speed variation of the propeller.

It will be further observed that in view of the settings of the pitch of the propeller to employ an aero-dynamically neutral section of the blades, there is secured an improved adjustment of the variable pitch control device.

It will be understood that while I have shown and described a splined stud 28 for securing the rotational effect of the propeller, other means will suggest themselves for securing relative rotation of the propeller blade upon centrifugal displacement of the weights restrained by the springs 44.

It will further be observed that while my invention secures the most desirable functioning by the utilization of all of the elements assembled, novelty is attributed to segregated portions thereof, as will be more clearly emphasized in the appended claims and, therefore, my invention is not to be limited to the utilization of the specifically described associated elements.

Having thus described my invention and illustrated its use, what I claim as new and desire to secure by Letters Patent, is:

1. A variable pitch propeller comprising, in combination, a hub adapted to be mounted on a propeller shaft, a housing associated with the hub and formed with radially-disposed openings therein, propeller blades journalled within said openings, thrust bearings restraining outward movement of the blades in their journal supports, means for varying the pitch of the blades due to angular velocity of the propeller, such means comprising a weight associated with each blade positioned within the housing, each of the weights being adapted to move radially outwardly by centrifugal action upon rotation of the propeller, a driving element associated with the weight for increasing the pitch of the blade as such weight moves outwardly, and a driven element associated with the inner end of the blade, one of such elements comprising a helical member, and the other of such elements comprising a member contacting the helical member, means for restraining outward movement of the weights including compression springs positioned between the weights, rods connecting each end of the springs with the weight positioned adjacent to the opposite end of such springs, whereby outward movement of the weights at opposite ends of the spring will cause compression of such spring, lever means for equalizing outward movement of the opposed weights, and adjustable, spring-pressed detents for retaining the weights in their outermost positions, against the action of the compression springs tending to retract the weights, until the angular velocity of the propeller has decreased to a predetermined maximum.

2. A variable pitch propeller comprising, in combination, a hub adapted to be mounted on a propeller shaft, a housing associated with the hub and formed with radially-disposed openings therein, propeller blades journalled within said openings, thrust bearings restraining outward movement of the blades in their journal supports, means for varying the pitch of the blades due to angular velocity of the propeller, such means comprising a weight associated with each blade positioned within the housing, means for supporting the weights to permit substantially straight-line, non-rotational movement thereof radially of the propeller shaft, as a result of centrifugal action due to rotation of the propeller, a driving element associated with the weight for increasing the pitch of the blade as such weight moves outwardly, and a driven element associated with the inner end of the blade, one of such elements comprising a helical member, and the other of such elements comprising a member contacting the helical member, means for restraining outward movement of the weights including compression springs positioned between the weights, rods connecting each end of the springs with the weight positioned adjacent to the opposite end of such springs, whereby outward movement of the weights at opposite ends of the spring will cause compression of such spring, lever means for equalizing outward movement of the opposed weights, and an adjustable, spring-pressed detent associated with each weight for retaining such weight in its outermost position, against the action of the compression springs tending to retract the weights, until speed of rotation of the propeller has decreased to a predetermined maximum.

3. A variable pitch propeller comprising, in combination, a hub adapted to be received on a propeller shaft, a housing associated with the hub and formed with radially-disposed openings therein, propeller blades rotatably mounted within said openings, the inner end of each blade having a longitudinal bore therein, thrust bearings restraining outward movement of the blades in their journal supports, a weight associated with each propeller blade positioned within the housing, each of said weights being adapted to move radially outwardly, due to centrifugal action, upon rotation of the propeller, means for imparting partial rotation to the blade upon such outward movement of the weight, thereby increasing the pitch of said propeller, said means including a stud carried by the weight and formed with a helical element on the periphery of such stud, the bore in the blade being provided with a follower element which is contacted by the helical element, imparting rotation to the blade as the stud moves radially, means for restraining outward movement of the weights including compression springs positioned between the weights, rods connecting each end of the springs with the weight positioned adjacent to the opposite end of such springs, whereby outward movement of the weight will cause compression of the springs, lever means for equalizing outward movement of the opposed weights, and adjustable, spring-pressed detents for retaining the weights in their outermost positions, against the action of the compression springs tending to retract the weights.

MICHAEL GREGOR.